(12) United States Patent
Aramaki et al.

(10) Patent No.: US 8,295,786 B2
(45) Date of Patent: Oct. 23, 2012

(54) MAGNETIC SHEET, METHOD FOR PRODUCING THE MAGNETIC SHEET, ANTENNA, AND PORTABLE COMMUNICATION DEVICE

(75) Inventors: Keisuke Aramaki, Tochigi (JP); Junichiro Sugita, Tochigi (JP); Morio Sekiguchi, Tochigi (JP)

(73) Assignee: Sony Chemical & Information Device Corporation, Tokyo (JP)

( * ) Notice: Subject to any disclaimer, the term of this patent is extended or adjusted under 35 U.S.C. 154(b) by 0 days.

(21) Appl. No.: 12/633,393

(22) Filed: Dec. 8, 2009

(65) Prior Publication Data

US 2010/0099365 A1    Apr. 22, 2010

Related U.S. Application Data

(63) Continuation of application No. PCT/JP2008/061039, filed on Jun. 17, 2008.

(30) Foreign Application Priority Data

Jun. 21, 2007    (JP) .................................. 2007-163861
May 26, 2008    (JP) .................................. 2008-136338

(51) Int. Cl.
    *H04B 1/38* (2006.01)
(52) U.S. Cl. ......... 455/90.3; 455/73; 428/324; 428/323; 428/328; 428/329; 428/336; 428/839.3; 428/842.6; 428/447; 423/609; 423/610; 423/611; 423/612; 423/613; 423/614; 423/615; 423/616; 427/130; 206/307; 235/451; 235/492; 343/841; 343/725; 343/728; 252/62.53; 252/62.55
(58) Field of Classification Search .................... 455/73; 428/324, 323, 328, 329, 336, 839.3, 842.6, 428/447; 423/609, 610, 611, 612, 613, 614, 423/615, 616; 427/130; 206/307; 235/451, 235/492; 343/841, 725, 728; 252/62.53, 252/62.55

See application file for complete search history.

(56) References Cited

U.S. PATENT DOCUMENTS 6,042,937 A * 3/2000 Hayashi et al. ............... 428/323
(Continued)

FOREIGN PATENT DOCUMENTS

CN    1816945    8/2006
(Continued)

OTHER PUBLICATIONS

International Search Report (PCT/ISA/210) dated Jul. 14, 2008.
(Continued)

*Primary Examiner* — April G Gonzales
(74) *Attorney, Agent, or Firm* — Buchanan Ingersoll & Rooney PC

(57) ABSTRACT

The present invention provides a magnetic sheet with improved resistance to folding while maintaining good magnetic characteristics and reliability; a method for producing the magnetic sheet; an antenna; and a portable communication device.

A magnetic sheet of the present invention includes a flat magnetic powder, and a resin binder capable of dissolving in a solvent, wherein the magnetic sheet has a gradient of the content ratio of the magnetic powder to the resin binder in a thickness direction thereof, wherein, in use, the magnetic sheet is folded so that, of the front and back surfaces thereof, one surface whose magnetic powder content is lower than that of the other is folded inward, and wherein the difference in glossiness measured at a light-incident angle of 60° between the front and back surfaces is 9.4 or more.

16 Claims, 4 Drawing Sheets

U.S. PATENT DOCUMENTS

| | | | |
|---|---|---|---|
| 6,063,490 A * | 5/2000 | Hayashi et al. | 428/328 |
| 6,248,437 B1 * | 6/2001 | Hayashi et al. | 428/328 |
| 6,458,452 B1 * | 10/2002 | Hayashi et al. | 428/323 |
| 7,267,896 B2 * | 9/2007 | Kuse et al. | 428/839.3 |
| 7,561,114 B2 * | 7/2009 | Maezawa et al. | 343/841 |
| 7,712,672 B2 * | 5/2010 | Takahashi et al. | 235/492 |
| 2007/0095913 A1 | 5/2007 | Takahashi et al. | |
| 2010/0052992 A1 * | 3/2010 | Okamura et al. | 343/700 MS |

FOREIGN PATENT DOCUMENTS

| | | |
|---|---|---|
| JP | 2000-144077 A | 5/2000 |
| JP | 2003-257723 A | 9/2003 |
| JP | 2005-333244 A | 12/2005 |
| JP | 2006-114725 A | 4/2006 |
| JP | 2006-173443 A | 6/2006 |
| JP | 2007-95829 A | 4/2007 |
| JP | 2007-123868 A | 5/2007 |
| JP | 2008-4624 A | 1/2008 |
| JP | 2008-60395 A | 3/2008 |
| KR | 10-2006-0008332 | 1/2006 |
| WO | WO 2007/007834 A1 | 1/2007 |

OTHER PUBLICATIONS

Written Opinion of the International Searching Authority (PCT/ISA/237) dated Jul. 29, 2008.

International Preliminary Examination Report (PCT/IPEA/409) dated Oct. 10, 2008.

Korean Office Action issued on Nov. 18, 2011, in corresponding Korean Patent Application No. 10-2009-7026915.

Chinese Office Action issued on Nov. 23, 2011, in corresponding Chinese Patent Application No. 200880021089.

\* cited by examiner

_US 8,295,786 B2_

MAGNETIC SHEET, METHOD FOR PRODUCING THE MAGNETIC SHEET, ANTENNA, AND PORTABLE COMMUNICATION DEVICE

CROSS-REFERENCE TO RELATED APPLICATION

This is a continuation application of PCT/JP2008/061039, filed on Jun. 17, 2008.

TECHNICAL FIELD

The present invention relates to a magnetic sheet, a method for producing the magnetic sheet, an antenna, and a portable communication device. Specifically, the present invention relates to a magnetic sheet containing a flat magnetic powder and a resin binder capable of dissolving in a solvent, a method for producing the magnetic sheet, an antenna and a portable communication device each containing the magnetic sheet.

BACKGROUND ART

In recent years, a so-called Radio Frequency IDentification (RFID) system, which is used for individual management, has been being introduced to various industries. This RFID system is a technology in which by performing radio communication between a predetermined reader/writer and a so-called transponder—a small noncontact-type Integrated Circuit (hereinafter referred to as an "IC") device which stores various data so as to be readable and/or writable and which has a communication function, data are read from the transponder and/or written in the transponder in a non-contact manner. Specifically, the RFID system is based on the principle of electromagnetic induction, in which the magnetic flux generated from a reader/writer's loop antenna is magnetically coupled to a transponder's loop antenna through inductive coupling, whereby communication is performed between the transponder and the reader/writer. The RFID system is promising in various applications. For example, a transponder fabricated in the form of an IC tag is attached to articles for manufacturing management and/or logistics; a transponder fabricated in the form of an IC card is used for fare collection in transportation facilities or as an identification card used when someone enters or leaves buildings; and a transponder is mounted in, for example, portable phones, which then serves as an electronic money card for purchasing articles.

Such RFID system can write in or read out data easily and rapidly. This is because, unlike conventional contact-type IC card systems, the IC card based on the RFID system does not involve inserting into its reader/writer or contacting its metallic contact. Further, since necessary electric power is supplied to a transponder from a reader/writer through electromagnetic induction in the RFID system, a power source (e.g., a battery cell) is not required to be built it. Thus, the RFID system is advantageous in that it realizes provision of a transponder which has a simple structure, which is supplied at low cost, and which has high reliability.

In the RFID system, when there are metallic objects around a transponder, communication failures may occur due to them. For example, when mounted in a portable communication device such as a portable phone, a transponder is adversely affected by a metal casing or metal parts of the portable communication device to cause a problem in that the communication distance is shortened. The reason for this is as follows. Specifically, when a metallic object exists around a transponder based on the electromagnetic induction system, unfavorable displacement of resonance frequency, change in magnetic flux, etc. are caused by a change in inductance due to the metallic objects, resulting in that sufficient electric power cannot be ensured. Therefore, in the RFID system, in order to ensure a sufficiently broad range where a transponder can communicate with a reader/writer to a satisfactory extent, the transponder must be provided with a loop antenna which can radiate a electromagnetic field of a certain intensity of magnetic field.

In this case, in order that the adverse effects to the loop antenna by the metallic objects are reduced in other ways than a way in which the spacial configuration is appropriately changed, for example, use of magnetic materials is effective and reduces the adverse effects due to the metallic objects, lengthening the communication distance. Meanwhile, in the recent communication or electronic devices, a noise electromagnetic wave is more frequently radiated as the clock frequency becomes higher. As a result, external or internal interference occurs to cause, for example, improper operation of the devices themselves, adverse effects to peripheral devices, etc. The aforementioned magnetic materials are effective for preventing such electromagnetic interference. In view of this, for example, proposed are various composite magnetic sheets (soft magnetic sheets) which are prepared by dispersing/mixing an appropriate amount of flat soft magnetic powder in a binding agent such as rubber or plastic. When a transponder is mounted in a portable communication device such as a portable phone, in order to prevent the communication distance from being shortened due to a metal casing or battery pack of the portable communication device, a magnetic material sheet is attached to enhance the convergence of magnetic flux in an attempt to realize stable communication (see, for example, Japanese Patent Application Laid-Open (JP-A) No. 2005-333244).

Meanwhile, in recent years, portable communication devices (e.g., portable phones) have been being made thinner, lighter and cheaper. In view of this trend, various constituent parts of the portable communication devices are required to be made thinner and lighter.

Here, a battery pack is large of the constituent parts of each portable communication device. Thus, as shown in FIG. 10, for example, when an antenna main body 102 is disposed so as to surround the side wall of a battery pack 101 whose cross-sectional surface is generally rectangular, a large loop antenna can be formed and its structure can be made thinner than a conventional structure where a magnetic sheet and a loop antenna are disposed on the back surface of a battery pack.

In this structure, a magnetic sheet 103, which is formed so as to have an elongated shape whose width is virtually equal to the thickness of the battery pack 101, is attached via a predetermined adhesive material 104 so as to be along an antenna main body 102. When the magnetic sheet 103 is attached to the antenna main body 102 as described above, as indicated by reference character A in FIG. 10, the portions thereof corresponding to, for example, the corners of the battery pack 101 are folded.

The magnetic sheet 103 attached to the antenna main body 102 is, for example, exposed to a considerable amount of heat generated during charging of the battery pack 101, or to a considerable change in temperature caused when a user takes it in and out a pocket of his/her wear. In the portable communication device, when the magnetic sheet 103 is alternatingly exposed under low-temperature conditions and under high-temperature conditions or continuously exposed under high-temperature conditions, unfavorable deflection or floating between the magnetic sheet 103 and the antenna main body 102 may occur caused by the difference in linear expansion coefficient between the magnetic sheet 103 and the antenna main body 102. As a result, the portable communication device containing such a magnetic sheet involves unfavorable displacement of resonance frequency due to such deflection or floating. In view of this, demand has arisen for a portable communication device whose characteristics are not changed depending on its surrounding environment.

Here, by increasing the amount of the flat magnetic powder (i.e., a main material) contained in the magnetic sheet 103, its linear expansion coefficient can be decreased and made close to the linear expansion coefficient of the antenna main body 102 (for example, 17 ppm/° C. in the case of the antenna main body made of copper). However, when the amount of the flat magnetic powder contained in the magnetic sheet 103 is intended to be increased, its linear expansion coefficient may not be decreased depending on the type of a binder used. Further, when the magnetic sheet 103 is decreased in linear expansion coefficient, the flexibility thereof is decreased. As a result, when folded, the magnetic sheet involves failures such as crack formation. Such failures cause a problem in that the magnetic powder is diffused in the portable communication device, leading to a drop of reliability; e.g., degradation of performance.

In addition, as the amount of the flat magnetic powder contained in the magnetic sheet 103 is increased, the magnetic sheet becomes brittle. As a result, when alternatingly exposed under low-temperature conditions and under high-temperature conditions or continuously exposed under high-temperature conditions, the magnetic sheet problematically changes in thickness and/or magnetic characteristics. In contrast, when the amount of the flat magnetic powder contained in the magnetic sheet 103 is small, sufficient magnetic characteristics cannot be obtained, although the occurrence of the failures can be reduced. As a result, the communication distance of the formed portable communication device is shortened, which is problematic.

A so-called coating method, which is one method for producing a sheet of a soft magnetic composition, is suitable for the production of a thin magnetic sheet. But, for producing a thick magnetic sheet, it is necessary that a plurality of magnetic sheets are laminated and pressed with a laminator or pressing machine. Here, for decreasing the linear expansion coefficient, when a magnetic sheet is formed by laminating a plurality of magnetic sheets each of which is made using an epoxy group-containing acrylic rubber, an epoxy resin, an epoxy curing agent and a flat magnetic powder, it involves cracks to the same extent when folded both so that the front surface is folded inward and so that the back surface is folded inward; i.e., has low impact resistance.

In one possible solution against the problems relating to the amount of the flat magnetic powder, a magnetic sheet in which the relative flat magnetic powder amount to the binder is large is attached to another magnetic sheet in which the relative flat magnetic powder amount to the binder is small. The thus-obtained magnetic sheet is prevented from crack formation occurring when folded either so that the front surface is folded inward or so that the back surface is folded inward. The magnetic sheet having such a structure is very difficult to attain desired magnetic characteristics.

BRIEF SUMMARY OF THE INVENTION

The present invention solves the above existing problems and aims to achieve the following objects. Specifically, an object of the present invention is to provide a magnetic sheet having improved resistance to folding while having good magnetic characteristics and reliability; a method for producing the magnetic sheet; an antenna; and a portable communication device.

In view of the above, the present inventor conducted extensive studies and has obtained the following finding. Specifically, a magnetic sheet which is produced so as to have a gradient of the content ratio of the flat magnetic powder to the resin binder present therearound (i.e., the density of the resin binder is gradually increased or decreased) in a thickness direction thereof has different resistances to folding in the front and back surfaces without reducing its magnetic characteristics and reliability. The present invention has been accomplished on the basis of the finding.

The present invention is based on the finding obtained by the present inventor. Means for solving the above problems are as follows.

<1> A magnetic sheet including:

a flat magnetic powder, and a resin binder capable of dissolving in a solvent, wherein the magnetic sheet has a gradient of the content ratio of the magnetic powder to the resin binder in a thickness direction thereof, wherein, in use, the magnetic sheet is folded so that, of the front and back surfaces thereof, one surface whose magnetic powder content is lower than that of the other is folded inward, and wherein the difference in glossiness measured at a light-incident angle of 60° between the front and back surfaces is 9.4 or more.

The magnetic sheet according to <1> above has a gradient of the content ratio of the magnetic powder to the resin binder in a thickness direction thereof, and contains the magnetic powder in a larger amount than the resin binder at the side of one surface and contains the resin binder in a larger amount than the magnetic powder at the side of the other surface. Thus, the magnetic sheet can have different resistances to folding in the front and back surfaces without reducing its magnetic characteristics and reliability.

Notably, the state indicated by the term "folded" described in <1> above encompasses not only a state where the angle formed between surfaces of a folded magnetic sheet in which surfaces the magnetic powder contents are lower (as indicated by reference character X in FIG. 4) is 0° to 90° but also a state where the angle formed therebetween is greater than 90°.

<2> The magnetic sheet according to <1> above, wherein the resin binder is a copolymer of an epoxy resin and an acrylic rubber having an epoxy group as a functional group.

<3> The magnetic sheet according to any one of <1> and <2> above, wherein the magnetic sheet is produced by applying onto a predetermined base a magnetic composition which comprises the flat magnetic powder and the resin binder capable of dissolving in a solvent and has such a mixing ratio thereof or viscosity that the magnetic powder sediments, and drying over a predetermined time or longer the magnetic composition applied.

<4> The magnetic sheet according to <3> above, wherein the magnetic sheet is a magnetic sheet which is produced by performing, once or more, applying a magnetic composition having the same composition as that of the magnetic composition onto the magnetic sheet having been formed by drying the magnetic composition, and drying over a predetermined time or longer the magnetic composition applied.

<5> The magnetic sheet according to any one of <3> and <4> above, wherein the magnetic sheet is a magnetic sheet which is produced by pressing the magnetic sheet having been formed by drying the magnetic composition.

<6> A method for producing a magnetic sheet, the method including: applying onto a predetermined base a magnetic composition which contains a flat magnetic powder and a resin binder capable of dissolving in a solvent and has such a mixing ratio thereof or viscosity that the magnetic powder sediments, and drying the magnetic composition applied onto the base over a predetermined time or longer so as to produce a magnetic sheet which has a gradient of the content ratio of the magnetic powder to the resin binder in a thickness direction thereof and in which the difference in glossiness measured at a light-incident angle of 60° between front and back surfaces is 9.4 or more.

The method according to <6> for producing a magnetic sheet includes an applying step of applying onto a predetermined base a magnetic composition which contains a flat magnetic powder and a resin binder capable of dissolving in a solvent and has such a mixing ratio thereof or viscosity that the magnetic powder sediments, and a drying step of drying the magnetic composition applied onto the base over a predetermined time or longer so as to produce a magnetic sheet which has a gradient of the content ratio of the magnetic powder to the resin binder in a thickness direction thereof and in which the difference in glossiness measured at a light-incident angle of 60° between front and back surfaces is 9.4 or more. Thus, the magnetic sheet produced by this method contains the magnetic powder in a larger amount than the resin binder at the side of one of the front and back surfaces thereof and contains the resin binder in a larger amount than the magnetic powder at the side of the other. The thus-produced magnetic sheet has different resistances to folding in the front and back surfaces without reducing its magnetic characteristics and reliability.

<7> The method according to <6> above, further including secondarily applying, onto the magnetic sheet having been formed by drying the magnetic composition, a magnetic composition having the same composition as that of the magnetic composition; and secondarily drying over a predetermined time or longer the magnetic composition applied onto the magnetic sheet in the secondarily applying, wherein the secondarily applying and the secondarily drying are performed once or more to produce a magnetic sheet having a gradient of the content ratio of the magnetic powder to the resin binder in a thickness direction thereof.

<8> The method according to any one of <6> and <7> above, further including pressing the magnetic sheet formed by drying the magnetic composition.

<9> An antenna including:
a magnetic sheet which contains a flat magnetic powder and a resin binder capable of dissolving in a solvent and which has a gradient of the content ratio of the magnetic powder to the resin binder in a thickness direction thereof, and an antenna main body which is attached, of the front and back surfaces of the magnetic sheet, to one surface whose magnetic powder content is higher than that of the other, wherein the antenna is folded so that, of the front and back surfaces of the magnetic sheet, one surface whose magnetic powder content is lower than that of the other is folded inward, and wherein the difference in glossiness measured at a light-incident angle of 60° between the front and back surfaces is 9.4 or more.

The antenna according to <9> above includes the magnetic sheet having a gradient of the content ratio of the magnetic powder to the resin binder in a thickness direction thereof, and the antenna main body which is attached, of the front and back surfaces of the magnetic sheet, to one surface whose magnetic powder content is higher than that of the other. Thus, of one surface (front or back surface) of the magnetic sheet which surface contains the magnetic powder in a larger amount than the resin binder and the other surface (back or front surface) thereof which contains the resin binder in a larger amount than the magnetic powder, one surface whose magnetic powder content is higher is attached to the antenna main body. This magnetic sheet has different resistances to folding in the front and back surfaces without reducing its magnetic characteristics and reliability.

<10> The antenna according to <9> above, wherein the antenna main body contains copper, and the resin binder is a copolymer of an epoxy resin and an acrylic rubber having an epoxy group as a functional group.

In the antenna according to <10> above, the antenna main body contains copper, and the resin binder is a copolymer of an epoxy resin and an acrylic rubber having an epoxy group as a functional group. Thus, the linear expansion coefficient of the magnetic sheet can made closer to that of the antenna main body. Therefore, even when alternatingly exposed under low-temperature conditions and under high-temperature conditions or continuously exposed under high-temperature conditions, this antenna does not easily involve deflection or floating.

<11> The antenna according to any one of <9> and <10> above, wherein the antenna main body has a structure utilizing a flexible flat cable.

<12> A portable communication device including:
a transponder which stores various data so as to be readable or writable and which has a communication function, wherein the transponder includes an antenna in which an antenna main body is attached, of the front and back surfaces of a magnetic sheet which contains a flat magnetic powder and a resin binder capable of dissolving in a solvent and which has a gradient of the content ratio of the magnetic powder to the resin binder in a thickness direction thereof, to one surface whose magnetic powder content is higher than that of the other, wherein the antenna is folded so that, of the front and back surfaces of the magnetic sheet, one surface whose magnetic powder content is lower than that of the other is folded inward, and wherein the difference in glossiness measured at a light-incident angle of 60° between the front and back surfaces is 9.4 or more.

The portable communication device according to <12> above includes an antenna in which an antenna main body is attached, of the front and back surfaces of the magnetic sheet which contains a flat magnetic powder and a resin binder capable of dissolving in a solvent and which has a gradient of the content ratio of the magnetic powder to the resin binder in a thickness direction thereof, to one surface whose magnetic powder content is higher than that of the other, wherein the antenna is folded so that, of the front and back surfaces of the magnetic sheet, one surface whose magnetic powder content is lower than that of the other is folded inward. The magnetic sheet and the antenna main body do not easily involve deflection or floating. The magnetic sheet has different resistances to folding in the front and back surfaces without reducing its magnetic characteristics and reliability.

The present invention can provide a magnetic sheet with improved resistance to folding while maintaining good magnetic characteristics and reliability; a method for producing the magnetic sheet; an antenna; and a portable communication device. These can solve the above existing problems.

DETAILED DESCRIPTION OF THE INVENTION

Figure 1A:
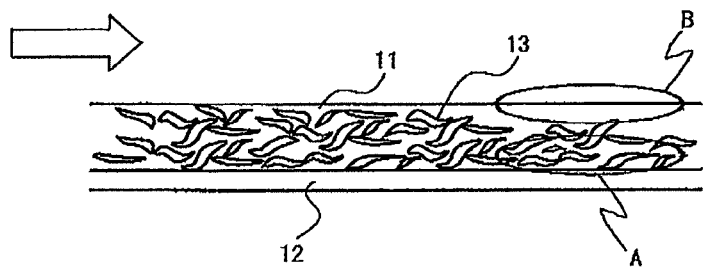
FIG. 1A is an explanatory view of a step of a method for producing a magnetic sheet shown as an embodiment of the present invention (part 1), wherein the arrow indicates a direction in which a magnetic composition is applied.

With reference to the drawings, specific embodiments of the present invention will next be described in detail.

This embodiment relates to a magnetic sheet suitably used in, for example, an Integrated Circuit (IC) card and an IC tag, which are used in a so-called Radio Frequency IDentification (RFID) system. In particular, this magnetic sheet is suitably used with being mounted in a portable communication device such as a portable phone.

(Magnetic Sheet)

A magnetic sheet of the present invention contains a magnetic powder and a resin binder; and, if necessary, further contains appropriately selected other components.

—Magnetic Powder (Inorganic Filler)—

The magnetic powder (inorganic filler) is not particularly limited, so long as it is a flat magnetic powder, and may be appropriately selected depending on the purpose. Examples thereof include flat soft magnetic materials. The flat soft magnetic materials may be made of any soft magnetic materials. Suitable examples of the soft magnetic materials include magnetic stainless steel (Fe—Cr—Al—Si alloy), Sendust (Fe—Si—Al alloy), permalloy (Fe—Ni alloy), silicon copper (Fe—Cu—Si alloy), Fe—Si alloy, Fe—Si—B(—Cu—Nb) alloy, Fe—Si—Cr—Ni alloy, Fe—Si—Cr alloy, and Fe—Si—Al—Ni—Cr alloy. The magnetic sheet produced from a soft magnetic powder made of the above soft magnetic material(s) can be suitably used for applications or radiowave absorbers in the RFID system, since the magnetic powder(s) has(have) excellent soft magnetic properties.

The flat soft magnetic powder preferably has a major axis of 1 μm to 200 μm and a flattening of 10 to 100. In order for the flat soft magnetic powder to have a uniform size, if necessary, classification may be performed using, for example, a sieve.

Further, the soft magnetic powder may be, for example, a soft magnetic powder which has been subjected to coupling treatment using a coupling agent such as a silane coupling agent. Use of the soft magnetic powder subjected to coupling treatment enhances the effect of enforcing the interface between the flat soft magnetic powder and a polymer binding agent, improving the specific gravity and corrosion resistance. Examples of the coupling agent employable include γ-methacryloxypropyltrimethoxysilane, γ-glycidoxypropyltrimethoxysilane and γ-glycidoxypropylmethyldiethoxysilane. Notably, coupling treatment may be performed on a soft magnetic powder in advance; or by mixing soft magnetic powder, a resin binder, and a coupling agent with one another, coupling treatment may be performed. In addition, titanate-based coupling agents may be used.

—Resin Binder (Polymer Binding Agent)—

The resin binder (polymer binding agent) is not particularly limited, so long as it can dissolve in a solvent, and may be appropriately selected depending on the purpose. Examples thereof include epoxy resins, polyester resins, polyurethane resins and copolymers thereof. In particular, the resin binder used is preferably a copolymer of an epoxy resin and an acrylic rubber having an epoxy group as a functional group. Use of such a copolymer can provide a magnetic sheet whose thickness and magnetic characteristics are changed to a less extent, even when it is alternatingly exposed under low-temperature conditions and under high-temperature conditions or continuously exposed under high-temperature conditions. Also, the resin binder may be a polyester resin which has good processability and in which a flat soft magnetic powder is aligned at a high density. But, when a polyester resin is used, the solvent volatilizing upon drying cannot be released outside from the front and back surfaces of a magnetic sheet and may swell inside the magnetic sheet. Notably, the polyester resin serving as the resin binder may be a phosphorus-containing polyester resin having a phosphorus residue. Use of the phosphorus-containing polyester resin can provide a magnetic sheet with flame retardancy.

Here, it is not easy that a flat soft magnetic powder is filled in a resin binder at a high density through mixing. This is because, when mixed with the resin binder, the flat soft magnetic powder is pulverized to be small due to load during mixing. In addition, the flat soft magnetic powder is greatly deformed, which causes a drop in magnetic permeability μ'. Thus, a polymer binding agent capable of dissolving in a solvent is used as the resin binder to be mixed with the flat soft magnetic powder, and these components are mixed with each other so as not to apply load to the flat soft magnetic powder to the greatest extent possible, thereby preparing a magnetic composition, which is then applied onto a base to form a magnetic sheet.

Notably, when the magnetic composition is applied under application of a magnetic field, the flat soft magnetic powder can be effectively aligned/arranged in an in-place direction, resulting in that the soft magnetic powder can be filled at a high density. Also, for increasing the specific gravity, the magnetic sheet after drying may be pressed. By increasing the specific gravity of the magnetic sheet, the amount of air contained therein is decreased, leading to a further improvement in flame retardancy.

Further, in order for the flat soft magnetic powder to be easily aligned, preferably, a resin binder with a high flowability is dissolved in a solvent to prepare a magnetic composition having a predetermined viscosity. The viscosity of the magnetic composition can be adjusted using various solvents such as aromatic hydrocarbon compounds (e.g., benzene, toluene and xylene), methyl ethyl ketone, cyclohexanone and methylisobutylketone. Also, for adjusting the shape of the magnetic composition applied, a high-boiling-point solvent (e.g., diacetone alcohol) may be added in a small amount of 5% or lower.

The viscosity of the magnetic composition may be adjusted to such an extent that the composition can be applied with, for example, a coater or a doctor blade method. But, when the viscosity is intended to be made too low, the amount of the resin binder component is increased, causing a problem in that the formed sheet has a low specific gravity. The solid content of the magnetic composition is preferably adjusted to fall within a range of 50% by mass to 70% by mass. When the solid content is more than 70% by mass; i.e., the viscosity is high, the magnetic composition may not be applied or may form a streaky sheet, which is disadvantageous. Whereas the solid content is less than 50% by mass, the magnetic composition is problematically repelled by a releasing agent on a base when applied on the base.

—Other Components—

Further, the magnetic composition may contain dispersed particles which are not compatible to the constituent resin of the resin binder. The surface of the magnetic sheet is smoothed by virtue of the dispersed particles and thus, the magnetic sheet can have good appearance involving no traces formed after the air contained in the resin is released at a subsequent step of pressing the sheet. Here, the dispersed particles are preferably insulative. Further, when the dispersed particles are a flame retardant, the formed magnetic sheet can be provided with flame retardancy.

The flame retardant used may be any flame retardants. Examples thereof include zinc-based flame retardants, nitrogen-based flame retardants and hydroxide-based flame retardants. Further examples include magnesium hydroxide, aluminum hydroxide, expanded graphite, red phosphorus and ammonium polyphosphate. Examples of the zinc-based flame retardants include zinc carbonate, zinc oxide and zinc borate, with zinc carbonate being preferred. Examples of the nitrogen-based flame retardants include melamine (cyanuric triamide), ammeline (cyanuric diamide), ammelide (cyanuric monoamide), melam, melamine cyanurate and melamine derivatives (e.g., benzoguanamine). Of these, the use of melamine cyanurate is preferred from because of its dispersibility and miscibility in a polyester resin. Instead of the flame retardant, carbon black, titanium oxide, boron nitride, aluminum nitride, alumina, etc. may be added.

Also, the magnetic sheet may contain a crosslinking agent in addition to the soft magnetic powder and the resin binder. Examples of the crosslinking agent include a blocked isocyanate. The blocked isocyanate is an isocyanate compound protected by a protective group which can be removed (deprotected) by heating, so that the isocyanate group (—NCO) does not react at room temperature. This blocked isocyanate does not crosslink the constituent resin of the resin binder at room temperature. But, when the blocked isocyanate is heated to a temperature equal to or higher than the temperature at which the protective group is removed, the protective group is removed and the isocyanate group is activated to crosslink the resin.

Notably, the blocked isocyanate preferably is protected by a protective group which is removed at 120° C. to 160° C. By using a protective group which is removed at a temperature higher than 120° C., methyl ethyl ketone or toluene, which is used for adjusting the viscosity of a magnetic composition to be applied onto a base, can be evaporated to dry the magnetic sheet. In contrast, in the case where the protective group used is removed at a temperature lower than 120° C., when the applied magnetic composition on a base is dried at a temperature equal to or higher than the boiling point of methyl ethyl ketone or toluene, the protective group of the blocked isocyanate is removed to potentially proceed crosslinking reaction of the resin. Further, since a film used as a base has a heat-resistant temperature of 160° C. or lower, the protective group used is preferably removed at 160° C. or lower. The crosslinking reaction of the resin slowly proceeds even at room temperature. Thus, after completion of heating, the resultant product is cooled to room temperature and then left to stand for a long time, whereby the resin is completely crosslinked and the resin binder is completely cured.

The amount of the blocked isocyanate added is preferably 0.5% by mass or more based on the amount of the constituent resin of the resin binder. When the blocked isocyanate is added in such an amount, the crosslinking reaction can proceed sufficiently. When the amount of the blocked isocyanate added is less than 0.5% by mass, the crosslinking reaction cannot proceed sufficiently. As a result, the formed magnetic sheet may greatly changes in thickness under high-temperature conditions or high-humidity conditions.

When the magnetic composition containing an unblocked isocyanate is applied onto a base and then shaped into a sheet by removing the solvent, the crosslinking reaction of the resin proceeds. As a result, even when the resultant sheet is pressed, satisfactory magnetic characteristics cannot be obtained. In this case, the thickness of the magnetic sheet greatly changes; e.g., becomes large, since the sheet pressed is partially cured.

The base usable may be a film. Examples thereof include a polyethylene terephthalate film, a polyethylene naphthalate film, a polyimide film, a polyphenylene sulfide film, a polypropylenoxide film, a polyethylene film, a polypropylene film and a polyamide film. The thickness of the film may be appropriately selected and, for example, several micrometers to several hundreds micrometers. Preferably, a releasing agent is applied onto the film surface on which a magnetic sheet is to be formed.

The magnetic sheet shown as an embodiment of the present invention is produced mainly from a magnetic composition containing at least a magnetic powder and a resin binder; and, if necessary, containing other appropriately selected components. Here, the magnetic sheet is produced so that the content ratio of the flat magnetic powder to the resin binder has a gradient in a thickness direction thereof, and that the difference in glossiness measured at a light-incident angle of 60° between its front and back surfaces becomes 9.4 or more. Next will be described a method for producing such a magnetic sheet that has a gradient of the content ratio of them. The magnetic powder content of the magnetic sheet is preferably 60% by mass to 95% by mass.

In the production of the magnetic sheet, when the mixing ratio of the flat magnetic powder to the resin binder is equal to or lower than a predetermined value, the magnetic powder sediments toward the base before the magnetic composition applied onto the base is completely dried. As a result, the difference in the content ratio of the magnetic powder to the resin binder is given between the base side and the opposite side thereto. In a method for producing the magnetic sheet shown as an embodiment of the present invention, by adjusting the material composition of a magnetic composition and controlling the drying conditions, the formed magnetic sheet is produced so as to have a gradient of the content ratio of the flat magnetic powder to the resin binder present therearound (i.e., the density of the resin binder is gradually increased or decreased) in a thickness direction thereof. The resultant magnetic sheet contains the magnetic powder in a larger amount than the resin binder at the side of the base and contains the resin binder in a larger amount than the magnetic powder at the opposite side to the base.

(Method for Producing Magnetic Sheet)

A method of the present invention for producing a magnetic sheet includes an applying step and a drying step; and, if necessary, further includes appropriately selected other steps.

—Applying Step—

The applying step is a step of applying onto a predetermined base a magnetic composition which contains at least a flat magnetic powder and a resin binder capable of dissolving in a solvent and which has such a viscosity or a flat magnetic powder-resin binder mixing ratio that the magnetic powder sediments.

As to the material composition of the magnetic composition, the mixing ratio of the flat magnetic powder to the resin binder is equal to or lower than a predetermined value so that the magnetic powder sediments in the magnetic composition without being exposed to the surface. As shown in FIG. 1A, onto a predetermined base 12 is applied a magnetic composition 11, which is prepared to have such a material composition, using a coater (e.g., a pipe coater) whose gap is adjusted to form an applied product having a predetermined thickness.

—Drying Step—

The drying step is a step of drying over a predetermined time or longer the magnetic composition applied onto the base at the applying step.

The magnetic composition 11 applied onto the predetermined base 12 is dried over a predetermined time or longer to form a magnetic sheet. This is drying conditions of the magnetic composition. For example, the applied magnetic composition is dried for two min or longer using air of an ambient temperature of about 20° C. to about 40° C. so as not to evaporate the solvent more than required, and then is dried while being heated to a high temperature of about 60° C. to about 115° C. so that the solvent can be sufficiently evaporated, whereby a magnetic sheet is formed. The upper limit of the drying temperature is set to 115° C. considering that the magnetic composition 11 contains a crosslinking agent, but may be set to a temperature lower than that at which a crosslinking agent used initiates crosslinking reaction. The drying is preferably performed to such an extent that the solvent content is decreased to that equal to or lower than 1% by mass. When the amount of the residual solvent exceeds 1% by mass, the magnetic sheet after drying may stretch or break when peeled off from the base 12. In addition, when the residual solvent is evaporated, bulges are formed on the surface of the magnetic sheet.

Basically, the magnetic sheet having undergone the above applying and drying steps is pressed with a laminator or pressing machine (a pressing step described below). Here, in a series of production steps, at the time when the magnetic composition 11 is applied onto the base 12, the magnetic composition is a slurry composition in which the flat magnetic powder 13 and the solvent are moved freely in a solution. And, at the drying step, when the drying is performed slowly over a predetermined time or longer, the magnetic powder 13 sediments in the magnetic composition 11 toward the base 12 by its own weight by the time when the magnetic composition 11 is dried. As a result, as shown in FIG. 1A, the magnetic composition 11 has a gradient of the amount of the magnetic powder in the order of the coated areas; i.e., contains area A, where a larger amount of the magnetic powder 13 exists and which is at the base 12 side, and area B, where a larger amount of the resin binder exists and which is at the side opposite to the base 12. Thus, in the magnetic sheet after drying, the amount of the magnetic powder 13 is large at the base 12 side, but is small at the opposite side to the base 12 (i.e., a larger amount of the resin binder exists). That is, the magnetic sheet has a gradient of the content ratio of the magnetic powder 13 to the resin binder in a thickness direction thereof. Notably, when a series of applying and drying steps are performed as a production line, the rate at which the magnetic composition 11 applied onto the base 12 is conveyed is adjusted to control the drying time.

—Other Steps—

The other steps are not particularly limited and may be appropriately selected depending on the purpose. Examples thereof include a secondarily applying step, a secondarily drying step and a pressing step.

—Secondarily Applying Step—

The secondarily applying step is a step of further applying onto the magnetic sheet, which has been formed by drying the magnetic composition, a magnetic composition having the same composition as that of the magnetic composition.

—Secondarily Drying Step—

The secondarily drying step is a step of drying over a predetermined time or longer the magnetic composition applied onto the magnetic sheet at the secondarily applying step.

—Pressing Step—

The pressing step is a step of pressing the magnetic sheet which has been formed by drying the magnetic composition.

In consideration of the required thickness of the magnetic sheet, the applying and drying steps are repeatedly performed to laminate a plurality of magnetic sheets. Finally, the magnetic sheets are pressed with a laminator or pressing machine to form one magnetic sheet.

Figure 1B:
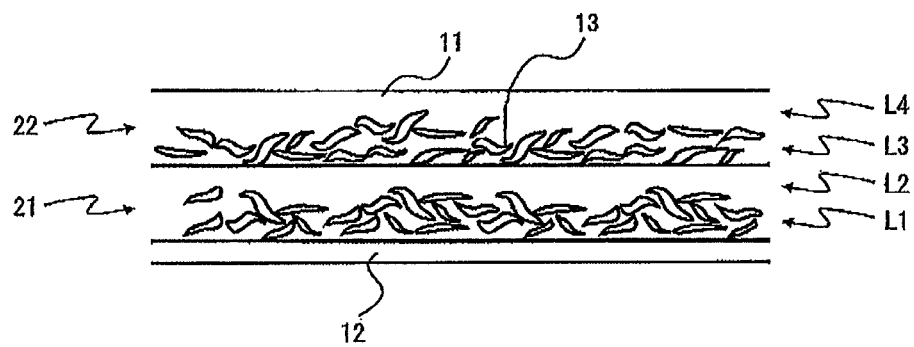
FIG. 1B is an explanatory view of a step of a method for producing a magnetic sheet shown as an embodiment of the present invention (part 2).

As shown in FIG. 1B, the magnetic composition 11 having the same composition is applied onto a magnetic sheet 21 (the first layer) after drying so as to have a predetermined thickness. The applied magnetic composition is dried over a predetermined time or longer similar to the drying of the first layer, to thereby form a magnetic sheet 22; i.e., the second layer. Thus, in the magnetic sheet 22 (the second layer), the magnetic powder 13 sediments toward in the magnetic composition 11 the interface between the magnetic sheet 21 (the first layer) and the magnetic sheet 22, by the time when the magnetic composition 11 (i.e., a main material) is dried. In this manner, a magnetic sheet is obtained which contains the following layers over the base 12 from bottom to top; i.e., layer L1 containing the magnetic powder 13 in a larger amount than the resin binder, layer L2 containing the resin binder in a larger amount than the magnetic powder 13, layer L3 containing the magnetic powder 13 in a larger amount than the resin binder, and layer L4 containing the resin binder in a larger amount than the magnetic powder 13.

Figure 1C:
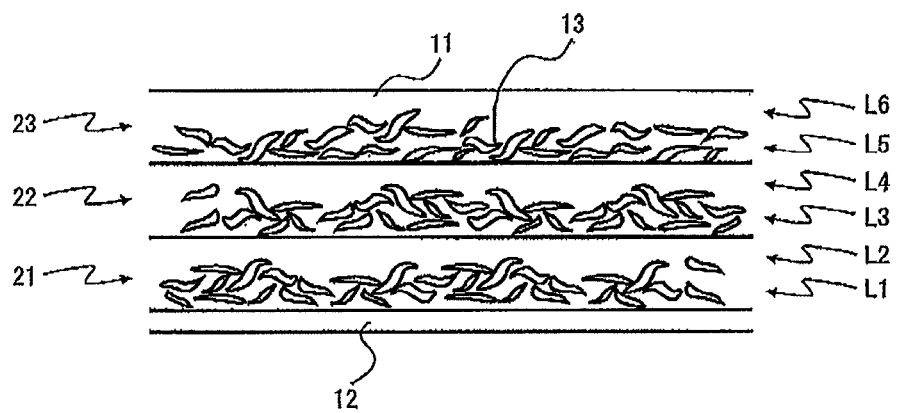
FIG. 1C is an explanatory view of a step of a method for producing a magnetic sheet shown as an embodiment of the present invention (part 3).

Further, as shown in FIG. 1C, the magnetic composition 11 having the same composition is applied onto the magnetic sheet 22 (the second layer) after drying so as to have a predetermined thickness. The applied magnetic composition is dried over a predetermined time or longer similar to the drying of the first and second layers, to thereby form a magnetic sheet 23; i.e., the third layer. Thus, in the magnetic sheet 23 (the third layer), the magnetic powder 13 sediments toward in the magnetic composition 11 the interface between the magnetic sheet 22 (the second layer) and the magnetic sheet 23, by the time when the magnetic composition 11 (i.e., a main material) is dried. In this manner, a magnetic sheet is obtained which contains the following layers over the base 12 from bottom to top; i.e., layer L1 containing the magnetic powder 13 in a larger amount than the resin binder, layer L2 containing the resin binder in a larger amount than the magnetic powder 13, layer L3 containing the magnetic powder 13 in a larger amount than the resin binder, layer L4 containing the resin binder in a larger amount than the magnetic powder 13, L5 containing the magnetic powder 13 in a larger amount than the resin binder, and L6 containing the resin binder in a larger amount than the magnetic powder 13.

In the production of the magnetic sheet, the above-described steps are repeatedly performed to laminate a plurality of magnetic sheets, and the resultant laminate is finally pressed with a laminator or pressing machine to form one magnetic sheet. After pressing of the laminate of the magnetic sheets, the interface(s) between the magnetic sheets is(are) molten, so that the magnetic sheets adhere to one another. As a result, the obtained magnetic sheet has a gradient of the content ratio of the magnetic powder 13 to the resin binder in a thickness direction thereof. That is, in the magnetic sheet, the magnetic powder 13 content is higher than the resin binder content at the side of the back surface, while the magnetic powder 13 content is lower than the resin binder content at the side of the front surface (i.e., the resin binder exists in a larger amount than the magnetic powder 13 at this side).

Figure 1D:
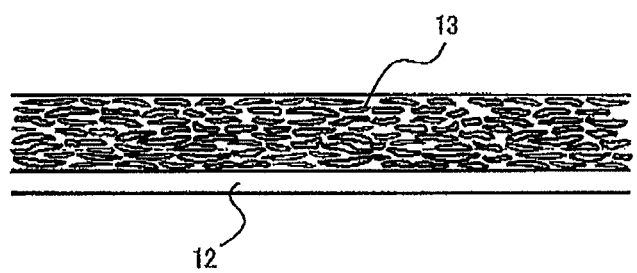
FIG. 1D is an explanatory view of a step of a method for producing a magnetic sheet shown as an embodiment of the present invention (part 4).

Specifically, as shown in FIG. 1C, in the case of the three-layered laminate formed by pressing the magnetic sheets 21, 22 and 23, layer L2, which contains the resin binder in a larger amount than the magnetic powder 13 and constitutes the magnetic sheet 21 (the first layer), adheres to layer L3, which contains the magnetic powder 13 in a larger amount than the resin binder and constitutes the magnetic sheet 22 (the second layer) while the interface therebetween is being molten; and layer L4, which contains the resin binder in a larger amount than the magnetic powder 13 and constitutes the magnetic sheet 22 (the second layer), adheres to layer L5, which contains the magnetic powder 13 in a larger amount than the resin binder and constitutes the magnetic sheet 23 (the third layer) while the interface therebetween is being molten. As a result, as shown in FIG. 1D, the finally-obtained magnetic sheet is a single-layered sheet whose magnetic powder 13 content is higher than the resin binder content at the side of the substrate 12 (at the side of the back surface) but is lower than the resin binder content at the side of the front surface (i.e., the resin binder exists in a larger amount than the magnetic powder 13 at this side).

The magnetic sheet may be produced in accordance with the above-described series of steps. This magnetic sheet is produced so that the total amount of the flat magnetic powder 13 is not made less than common cases, maintaining magnetic characteristics and reliability to a satisfactory level. Also, the magnetic sheet contains the magnetic powder 13 in a large amount only at one surface and the magnetic powder 13 in a small amount only at the other surface and thus, the surface containing the magnetic powder 13 in a large amount has low flexibility. Thus, the foldability of the magnetic sheet depends on which of the front and back surfaces is folded inward.

The above-described magnetic sheet, therefore, is suitably used while being mounted in a portable communication device (e.g., a portable phone) as a constituent part of a loop antenna of a transponder.

(Antenna)

An antenna of the present invention includes the magnetic sheet of the present invention and an antenna main body; and, if necessary, further includes appropriately selected other members.

The antenna main body is attached, of the front and back surfaces of the magnetic sheet, to the surface whose magnetic powder content is higher than the resin binder content.

(Portable Communication Device)

A portable communication device of the present invention includes a transponder containing at least the antenna of the present invention; and, if necessary, further includes appropriately selected other members.

The transponder stores various data so as to be readable and/or writable and has a communication function.

Figure 2A:
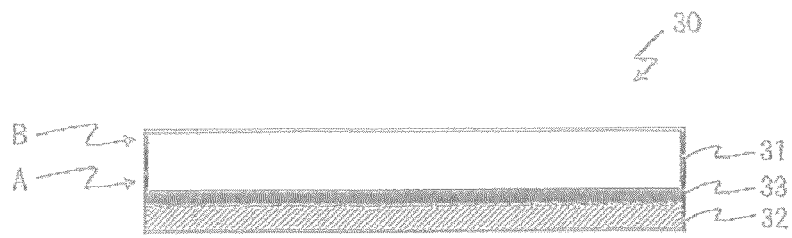
FIG. 2A is an elevational view of an essential part of an antenna in which an antenna main body is attached to a magnetic sheet shown as an embodiment of the present invention.
Figure 2B:
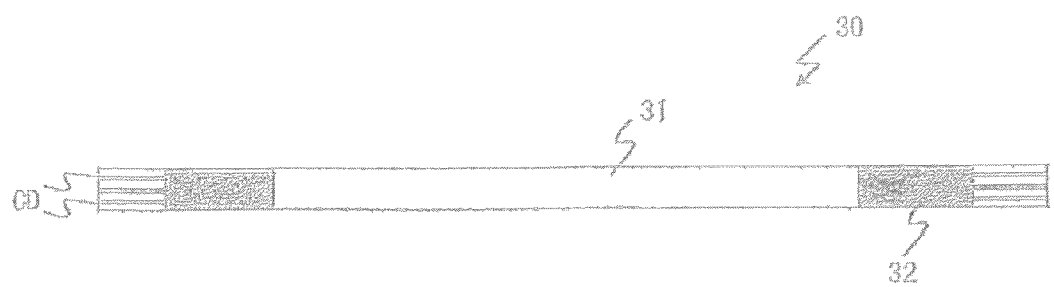
FIG. 2B is an explanatory plan view of an antenna in which an antenna main body is attached to a magnetic sheet shown as an embodiment of the present invention.
Figure 3:
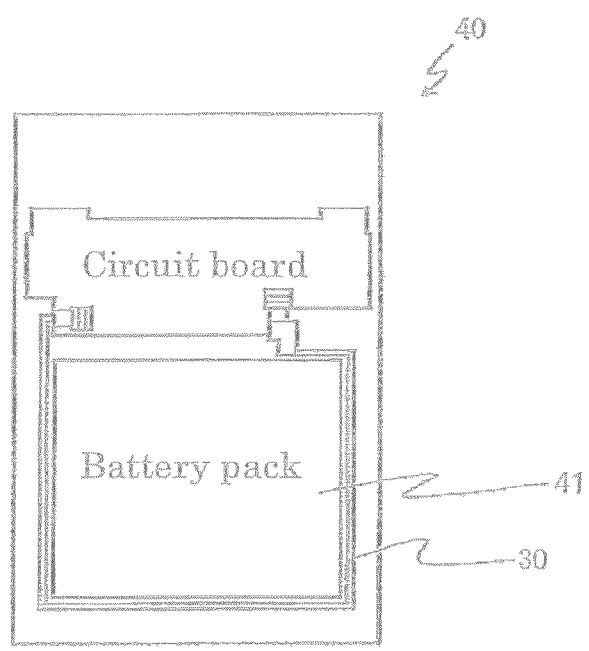
FIG. 3 is an elevational view of an essential part of the internal configuration of a portable communication device containing an antenna in which an antenna main body is attached to a magnetic sheet shown as an embodiment of the present invention.

As shown in FIGS. 2A and 2B, an antenna 30 is formed by attaching a magnetic sheet 31, which is formed so as to have an elongated shape whose width is virtually equal to the thickness of a battery pack for use in a portable communication device, via a predetermined adhesive material 33 so as to be along an antenna main body 32. Notably, from the viewpoint of cost reduction, the antenna main body 32 preferably has a structure utilizing a flexible flat cable (FFC) or flexible printed circuit (FPC). The flexible flat cable, as shown in FIG. 2B, is a cable which is formed as follows. Specifically, several conductive wires (CDs) are arranged at predetermined intervals, and then laminated and sandwiched between insulating materials onto which a predetermined adhesion layer has been provided. In this case, the antenna 30 is formed by attaching a magnetic sheet 31, for example, to the cover of a cable main body of the flexible flat cable. The antenna main body 32 is attached, of surface A of the magnetic sheet 31 in which surface the magnetic powder 13 content is higher and surface B thereof in which the resin binder content is higher; i.e., the magnetic powder 13 content is lower, to the surface A in which the magnetic powder 13 content is higher. In other words, the magnetic sheet 31 is attached to the antenna main body 32 so that surface B, whose magnetic powder 13 content is lower, is located at the farthest position from the antenna main body 32. Then, as shown in FIG. 3, the antenna 30 containing the magnetic sheet 31 attached to the antenna main body 32 is disposed so as to surround the side wall of a battery pack 41, whose cross-sectional surface is generally rectangular, in a portable communication device 40. As a result, the portable communication device 40 can have a large loop antenna.

Figure 4:
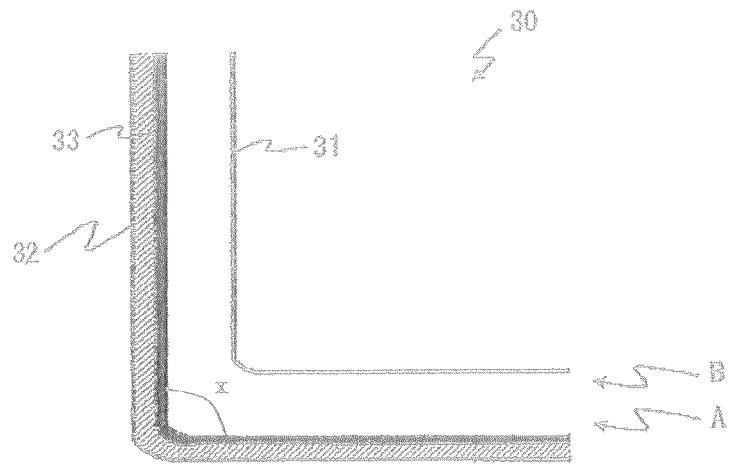
FIG. 4 is an elevational view of an essential part of a state where a magnetic sheet shown as an embodiment of the present invention is folded.

The magnetic sheet 31 is folded at portions corresponding to, for example, the corners of the battery pack 41. Here, as shown in FIG. 4, the magnetic sheet is folded so that surface B whose magnetic powder 13 content is smaller is folded inward.

In this portable communication device 40, of the front and back surfaces of the magnetic sheet 31; i.e., one surface (surface A) whose magnetic powder 13 content is higher and the other surface (surface B) which has higher flexibility and whose resin binder content is higher (i.e., the magnetic powder 13 content is lower), the antenna 30 is formed by attaching the surface A of the magnetic sheet to the antenna main body 32 and is disposed so that the surface B is folded inward. With this configuration, the portable communication device can be prevented from being degraded in magnetic characteristics and reliability, and can be increased in durability without involving failures (e.g., crack formation) even when the magnetic sheet is folded.

In the portable communication device 40, when the magnetic sheet 31 is formed using, as a resin binder, a copolymer of a predetermined acrylic rubber and an epoxy resin, and is attached to the antenna main body 32 at surface A thereof whose magnetic powder 13 content is higher to thereby form the antenna 30, the linear expansion coefficient of the magnetic sheet 31 can be made close to that of the antenna main body 32. Notably, the difference in linear expansion coefficient between the magnetic sheet and the antenna main body is preferably 10 ppm/° C. or lower. Even when alternatingly exposed under low-temperature conditions and under high-temperature conditions or continuously exposed under high-temperature conditions, the portable communication device 40 containing the above-described antenna 30 involves unfavorable deflection or floating to a lower extent. In the portable communication device 40, the antenna main body 32 to which the magnetic sheet 31 has been attached can avoid resonant frequency deviation caused by deflection or floating and thus, is not changed in characteristics by environmental factors.

As described above, by adjusting the material composition and controlling the drying conditions, the magnetic sheet 31 shown as an embodiment of the present invention is produced so as to have a gradient of the content ratio of the flat magnetic powder 13 to the resin binder present therearound (i.e., the density of the resin binder is gradually increased or decreased) in a thickness direction thereof. The resultant magnetic sheet contains the magnetic powder 13 in a large amount at one surface and contains the resin binder in a large amount at the other surface, and is excellent in magnetic characteristics and reliability and has improved resistance to folding.

The magnetic sheet 31 which is formed by using, as a resin binder, an epoxy group-containing acrylic rubber, an epoxy resin and an epoxy curing agent has low linear expansion coefficient. In addition, even when alternatingly exposed under low-temperature conditions and under high-temperature conditions, such a magnetic sheet can be changed in thickness and/or magnetic characteristics to a less extent. Thus, even when alternatingly exposed under low-temperature conditions and under high-temperature conditions or continuously exposed under high-temperature conditions with being attached to the antenna main body 32, the magnetic sheet involves less deformation and does not greatly change in communication distance for a long period of time.

Further, when attached via an adhesive material 33 to the surface of the magnetic sheet 31 in which surface the flat magnetic powder 13 content is higher (i.e., the surface of the magnetic sheet 31 which surface contains more voids), the antenna main body 32 does not come into direct contact with water contained in the air and thus, achieves good humidity resistance.

As shown in FIGS. 1A to 1D, the magnetic sheet 31 can be produced so as to have a gradient of the content ratio of the magnetic powder 13 to the resin binder in a thickness direction thereof, by applying the magnetic composition 11 onto the base 12 in a superposed manner (the magnetic composition 11 having the same composition is used every application). In other words, the magnetic sheet 31 can be produced by applying the magnetic composition 11 having the same composition in a superposed manner and thus, is excellent in magnetic characteristics. As described above, the magnetic sheet 31 is produced by applying the magnetic composition 11 in a superposed manner. Thus, the magnetic sheet does not have the interlayer surface(s) formed when produced by laminating a plurality of magnetic sheets. In addition, the magnetic sheet contains no air inside; i.e., can have a large specific gravity, and can have improved magnetic characteristics. And, the magnetic sheet 31 contains no air at portions corresponding to the interlayer surface(s). Thus, when repeatedly exposed under high-temperature conditions, the magnetic sheet changes in thickness and/or magnetic characteristics to a less extent.

In the portable communication device 40 in which the antenna 30 containing the magnetic sheet 31 has been mounted, the antenna main body 32 is formed so as to have a structure utilizing a flexible flat cable, which leads to cost reduction. The magnetic sheet 31 is not required to be attached to the entire surface of the antenna main body 32, and may be attached only to portions where the antenna main body 32 is greatly affected by other metallic objects of the portable communication device 40 (e.g., a metal casing and a battery pack 41).

The present invention will next be described by way of examples, which should not be construed as limiting the present invention thereto.

As shown in Tables 1 to 3, the present inventor actually produced magnetic sheets by changing the conditions such as the gradient of the content ratio of a magnetic powder to a resin binder in a magnetic sheet, and the type of a resin binder used. Each of the magnetic sheets was attached to an antenna main body for a transponder, and the resultant product was mounted in a portable phone. The portable phone was evaluated for the presence or absence of failures such as crack formation and was measured for magnetic characteristics. Notably, in the below-described Examples and Comparative Examples, the magnetic sheet used was produced using as a flat magnetic powder a Fe—Si—Cr—Ni-based alloy powder (JEM-S, product of Mitsubishi Materials Corporation).

TABLE 1

| | | Ex. 1 | Ex. 2 | Ex. 3 | Ex. 4 |
|---|---|---|---|---|---|
| Resin binder | Resin | Acrylic rubber | Acrylic rubber | Acrylic rubber | Acrylic rubber |
| | Mass average MW | 350,000 | 350,000 | 350,000 | 350,000 |
| | Functional group | Epoxy group | Epoxy group | Epoxy group | Epoxy group |
| | Grass transition temp. Tg (° C.) | 7.5 | 7.5 | 7.5 | 7.5 |
| Linear expansion coefficient (ppm/° C.) | | 18 | 18 | 19 | 20 |
| | | Good | Good | Good | Good |
| Specific gravity | | 3.45 | 3.47 | 3.43 | 3.41 |
| | | Good | Good | Good | Good |
| Change in thickness (%) | | 1.00 | 1.00 | 1.00 | 1.00 |
| | | Good | Good | Good | Good |

TABLE 1-continued

|  | Ex. 1 | Ex. 2 | Ex. 3 | Ex. 4 |
|---|---|---|---|---|
| Magnetic characteristics (magnetic permeability μ') | 40≦<br>Good | 40≦<br>Good | 40≦<br>Good | 40≦<br>Good |
| Magnetic characteristics (magnetic loss μ") | <1.5<br>Good | <1.5<br>Good | <1.5<br>Good | <1.5<br>Good |
| Crack formed when folded | No crack | No crack | No crack | No crack |
| Viscosity (cps) | 70,000 | 110,000 | 45,000 | 20,000 |
| Glossiness at back surface | 19.5 | 23 | 22.2 | 19.2 |
| Glossiness at front surface | 34 | 32.4 | 36.3 | 35.3 |
| Difference in glossiness | 14.5 | 9.4 | 14.1 | 16.1 |

TABLE 2

|  |  | Comp. Ex. 1 | Comp. Ex. 2 | Comp. Ex. 3 |
|---|---|---|---|---|
| Resin binder | Resin | Acrylic rubber | Acrylic rubber | Acrylic rubber |
|  | Mass average MW | 350,000 | 350,000 | 800,000 |
|  | Functional group | Epoxy group | Epoxy group | OH, COOH |
|  | Grass transition temp. Tg (° C.) | 7.5 | 7.5 | −17 |
|  | Linear expansion coefficient (ppm/° C.) | 18<br>Good | 18<br>Good | 42<br>Bad |
|  | Specific gravity | 3.45<br>Good | 3.45<br>Good | 2.64<br>Bad |
| Change in thickness (%) |  | 1.00<br>Good | 1.40<br>Good | 2.20<br>Bad |
| Magnetic characteristics (magnetic permeability μ') |  | 40≦<br>Good | 40≦<br>Good | 34<<br>Bad |
| Magnetic characteristics (magnetic loss μ") |  | <1.5<br>Good | <1.5<br>Good | <1.5<br>Good |
| Crack formed when folded |  | No crack | No crack | — |
| Viscosity (cps) |  | 70,000 | 70,000 | 65,000 |
| Glossiness at back surface |  | 23.1 | 21.5 | 23.9 |
| Glossiness at front surface |  | 32.5 | 24.8 | 32 |
| Difference in glossiness |  | 9.4 | 3.3 | 8.1 |

TABLE 3

|  |  | Comp. Ex. 4 | Comp. Ex. 5 | Comp. Ex. 6 |
|---|---|---|---|---|
| Resin binder | Resin | Acrylic rubber | NBR | Polyester |
|  | Mass average MW | 500,000 | 340,000 | 700,000 |
|  | Functional group | OH, COOH | COOH | OH, COOH |
|  | Grass transition temp. Tg (° C.) | −5 | −24 | 4 |
|  | Linear expansion coefficient (ppm/° C.) | 22<br>Good | 17<br>Good | 52<br>Bad |
|  | Specific gravity | 2.91<br>Bad | 2.96<br>Good | 3.4<br>Bad |
| Change in thickness (%) |  | 1.80<br>Medium | 3.00<br>Bad | 3.00<br>Bad |
| Magnetic characteristics (magnetic permeability μ') |  | 34<<br>Bad | 34<<br>Bad | 40≦<br>Good |
| Magnetic characteristics (magnetic loss μ") |  | <1.5<br>Good | <1.5<br>Good | <1.5<br>Good |
| Crack formed when folded |  | — | — | No crack |
| Viscosity (cps) |  | 60,000 | 50,000 | 68,000 |
| Glossiness at back surface |  | 23.4 | 24.3 | 36.2 |
| Glossiness at front surface |  | 33.4 | 34.5 | 35.8 |
| Difference in glossiness |  | 10 | 10.2 | 0.4 |

EXAMPLE 1

Production of Magnetic Sheet

In Example 1, as shown in Table 1, a mixture containing the following components was provided as a resin binder; i.e., 80 parts by mass of an epoxy group-containing acrylic rubber (SG80H-3, product of Nagase ChemteX Corporation), 23 parts by mass of an epoxy resin (EPICOAT (registered trademark) 1031S, product of Japan Epoxy Resins Co., Ltd.), and 7 parts by mass of an epoxy curing agent (HX3748, product of Asahi Kasei Chemicals Corporation). Separately, a solvent mixture containing 270 parts by mass of toluene and 120 parts by mass of ethyl acetate was provided as a solvent. The resin binder, the solvent and 550 parts by mass of the flat magnetic powder (product of Mitsubishi Materials Corporation) were homogeneously mixed with one another to prepare a soft magnetic composition. The thus-prepared soft magnetic composition was found to have a viscosity of 70,000 cps. Then, the soft magnetic composition was applied using a roll coater onto a polyethylene terephthalate (PET) release film (a base whose surface was subjected to release treatment), followed by drying at a temperature of room temperature to 115° C., to thereby produce a magnetic sheet whose magnetic powder content is high at the side of the PET release film but is low at the opposite side to the PET release film (i.e., which contains the resin binder in a large amount). The magnetic sheet finally used for the experiments was produced as shown in FIGS. 1A to 1D. Specifically, a series of such applying and drying steps were performed three times using the soft magnetic compositions each having the same composition as the above magnetic composition and finally, the resultant product was pressed.

Specifically, the first magnetic sheet was formed as follows: the soft magnetic composition was applied onto the PET release film so that the dry mass of the magnetic sheet per square meter of the PET release film was 300 g, followed by drying. The resultant magnetic sheet was found to have a thickness of 190 μm. By adjusting the drying time to a predetermined time or longer, the magnetic powder sedimented in the soft magnetic composition toward the PET release film by the time when the soft magnetic composition was dried, to thereby produce a magnetic sheet whose magnetic powder content is high at the side of the PET release film but is low at the opposite side to the PET release film.

Subsequently, the second magnetic sheet was formed as follows: the soft magnetic composition having the same composition was applied onto the first magnetic sheet so that the total mass of the first magnetic sheet and the second magnetic sheet after drying was 550 g, followed by drying. The resultant magnetic sheet was found to have a thickness of 330 μm. Also in this case, by adjusting the drying time to a predetermined time or longer, the magnetic powder sedimented in the soft magnetic composition toward the interface between the first and second magnetic sheets by the time when the soft magnetic composition for forming the second magnetic sheet was dried, to thereby produce a magnetic sheet in which a layer containing the magnetic powder in a larger amount, a layer containing the resin binder in a larger amount, a layer containing the magnetic powder in a larger amount, and a layer containing the resin binder in a larger amount were laminated on the PET release film in this order.

Furthermore, the third magnetic sheet was formed as follows: the soft magnetic composition having the same composition was applied onto the second magnetic sheet so that the total mass of the first and second magnetic sheets and the third magnetic sheet after drying was 850 g, followed by drying. The resultant magnetic sheet was found to have a thickness of 450 μm. Also in this case, by adjusting the drying time to a predetermined time or longer, the magnetic powder sedimented in the soft magnetic composition toward the interface between the second and third magnetic sheets by the time when the soft magnetic composition applied for forming the third magnetic sheet was dried, to thereby produce a magnetic sheet in which a layer containing the magnetic powder in a larger amount, a layer containing the resin binder in a larger amount, a layer containing the magnetic powder in a larger amount, a layer containing the resin binder in a larger amount, a layer containing the magnetic powder in a larger amount, and a layer containing the resin binder in a larger amount were laminated on the PET release film in this order.

Next, the PET release film was removed from the magnetic sheet obtained after drying. The both surfaces of the resultant magnetic sheet were sandwiched by new PET release films, and then were further sandwiched by 100-μm thick high-quality paper sheets serving as a buffering material. The both surfaces of the resultant product were sandwiched by two stainless steel plates, and then pressed at 24.9 kgf/cm$^2$ for 10 min using a predetermined vacuum press machine (product of KITAGAWA SEIKI CO., LTD.) with being heated to 170° C., to thereby a magnetic sheet used for experiments. The thus-pressed magnetic sheet was found to have a thickness of 250 μm. In the obtained magnetic sheet, through pressing, the interfaces between the magnetic sheets were molten and the magnetic sheets adhered to one another, and thus, the magnetic powder content is high at the side of one surface thereof but is low at the side of the other surface.

—Measurement of Viscosity of Magnetic Composition—

The viscosity of the magnetic composition was measured using a B-type viscometer rotor #6 (product of Tokimec Inc.) at 4 rpm.

—Evaluation of the Produced Magnetic Sheet—

The thus-produced magnetic sheet was found to have a linear expansion coefficient of 18 ppm/° C., which was close to the linear expansion coefficient of an antenna main body to which it was attached. Also, this magnetic sheet was found to have a good specific gravity of 3.45. And, a change in thickness thereof was found to be as small as 1.00% before and after the below-described environmental testing using an oven. Further, this magnetic sheet was found to have a magnetic permeability μ' of 40 or higher and a magnetic loss μ" lower than 1.5 at a carrier frequency of 13.56 MHz. That is, it was confirmed that this magnetic sheet itself had good magnetic characteristics and reliability. Also, this magnetic sheet was found to have a glossiness of 19.5 at the back surface and a glossiness of 34 at the front surface, and the difference in glossiness between the back and front surfaces was 14.5. Notably, the linear expansion coefficient, specific gravity, change in thickness, magnetic permeability μ' magnetic loss μ" and glossiness were measured as follows.

—Measurement of Linear Expansion Coefficient—

The linear expansion coefficient was measured using a heat/stress/strain meter (EXS TA6000 TMA/SS, SII Nano Technology Inc.).

—Measurement of Specific Gravity—

The specific gravity was measured as follows. First, the magnetic sheet was punched out to form a ring-shaped sample having an outer diameter of 7.05 mm and an inner diameter of 2.945 mm. The resultant sample was measured for thickness and mass, and then the specific gravity was calculated.

—Measurement of Change in Thickness (Measurement of Reliability)—

First, the magnetic sheet was measured for thickness. Next, the magnetic sheet was placed in an oven, followed by heating at 85° C./60% for 96 hours. The magnetic sheet was taken from the oven and then measured for thickness. And, a change in thickness of the magnetic sheet was calculated before and after heating.

—Measurement of Magnetic Permeability μ' and Magnetic Loss μ"—

First, the magnetic sheet was punched out to form a ring-shaped sample having an outer diameter of 7.05 mm and an inner diameter of 2.945 mm. Next, a conductive wire was wound around the sample five turns, and was soldered with a terminal. Here, the length from the terminal's base to the bottom of the ring-shaped sample was adjusted to 20 mm. Then, using an impedance analyzer ("4294A," product of Agilent Technologies), the sample was measured for inductance and resistance at a carrier frequency (13.56 MHz). The obtained values were converted to a magnetic permeability.

Notably, the magnetic permeability μ' corresponds to the real part of the complex magnetic permeability, and the magnetic loss μ" corresponds to the imaginary part thereof.

—Measurement of Glossiness—

Using a glossimeter (VG2000, product of NIPPON DENSHOKU INDUSTRIES CO., LTD.), the glossiness was measured at a light-incident angle of 60° (60° and −60° according to JIS Z8741 or JIS P8142.

—Evaluation of Resistance to Folding—

In order to evaluate this magnetic sheet for resistance to folding, as shown in FIG. 3, it was attached via an adhesive material to an antenna main body. The resultant product was disposed so as to surround the side wall of a battery pack of a portable phone. The magnetic sheet was attached to the antenna main body at the surface containing the magnetic powder in a larger amount as shown in FIG. 2A, and was folded so that the surface containing the magnetic powder in a smaller amount was folded inward as shown in FIG. 4.

As a result, the magnetic sheet involved no cracks in its surface, indicating that the magnetic sheet was able to be improved in resistance to folding.

Further, in order to evaluate the characteristics of a portable phone in which the magnetic sheet had been mounted, the portable phone was placed for 96 hours in an oven whose temperature and humidity had been set respectively to 85° C. and 60% for environmental testing. Specifically, before placed in the oven, the portable phone was measured for the resonant frequency. And, after heated in the oven, the portable phone taken from the oven was returned to ambient temperature and then was measured the resonant frequency. The thus-obtained resonant frequencies were compared with each other.

As a result, both the resonant frequencies before and after environmental testing were found to be 13.568 MHz as shown in Table 4. This indicates that the communication distance does not change depending on a change of its surrounding environment. Thus, the magnetic sheet of Example 1 was found to have excellent characteristics.

TABLE 4

| | Resonant frequency (MHz) | | |
| --- | --- | --- | --- |
| | Time 0 after placed in oven | Time 96 after placed in oven | Change in frequency (MHz) |
| Ex. 1 | 13.568 | 13.568 | 0 |
| Comp. Ex. 6 | 13.624 | 13.675 | 0.051 |

EXAMPLE 2

The procedure of Example 1 was repeated, except that a solvent mixture containing 260 parts by mass of toluene and 110 parts by mass of ethyl acetate was used as the solvent instead of the solvent mixture containing 270 parts by mass of toluene and 120 parts by mass of ethyl acetate, to thereby produce and evaluate a magnetic sheet. The results are shown in Table 1. Notably, the prepared soft magnetic composition was found to have a viscosity of 110,000 cps.

The produced magnetic sheet was found to have a linear expansion coefficient of 18 ppm/° C., which was close to the linear expansion coefficient of an antenna main body to which it was attached. Also, this magnetic sheet was found to have a good specific gravity of 3.47. And, a change in thickness thereof was found to be as small as 1.00% before and after the below-described environmental testing using an oven. Further, this magnetic sheet was found to have a magnetic permeability μ' of 40 or higher and a magnetic loss μ" lower than 1.5 at a carrier frequency of 13.56 MHz. That is, it was confirmed that this magnetic sheet itself had good magnetic characteristics and reliability. Also, this magnetic sheet was found to have a glossiness of 23 at the back surface and a glossiness of 32.4 at the front surface, and the difference in glossiness between the back and front surfaces was 9.4.

EXAMPLE 3

The procedure of Example 1 was repeated, except that a solvent mixture containing 270 parts by mass of toluene and 130 parts by mass of ethyl acetate was used as the solvent instead of the solvent mixture containing 270 parts by mass of toluene and 120 parts by mass of ethyl acetate, to thereby produce and evaluate a magnetic sheet. The results are shown in Table 1. Notably, the prepared soft magnetic composition was found to have a viscosity of 45,000 cps.

The produced magnetic sheet was found to have a linear expansion coefficient of 19 ppm/° C., which was close to the linear expansion coefficient of an antenna main body to which it was attached. Also, this magnetic sheet was found to have a good specific gravity of 3.43. And, a change in thickness thereof was found to be as small as 1.00% before and after the below-described environmental testing using an oven. Further, this magnetic sheet was found to have a magnetic permeability μ' of 40 or higher and a magnetic loss μ" lower than 1.5 at a carrier frequency of 13.56 MHz. That is, it was confirmed that this magnetic sheet itself had good magnetic characteristics and reliability. Also, this magnetic sheet was found to have a glossiness of 22.2 at the back surface and a glossiness of 36.3 at the front surface, and the difference in glossiness between the back and front surfaces was 14.1.

EXAMPLE 4

The procedure of Example 1 was repeated, except that a solvent mixture containing 280 parts by mass of toluene and 130 parts by mass of ethyl acetate was used as the solvent instead of the solvent mixture containing 270 parts by mass of toluene and 120 parts by mass of ethyl acetate, to thereby produce and evaluate a magnetic sheet. The results are shown in Table 1. Notably, the prepared soft magnetic composition was found to have a viscosity of 20,000 cps.

The produced magnetic sheet was found to have a linear expansion coefficient of 20 ppm/° C., which was close to the linear expansion coefficient of an antenna main body to which it was attached. Also, this magnetic sheet was found to have a good specific gravity of 3.41. And, a change in thickness thereof was found to be as small as 1.00% before and after the below-described environmental testing using an oven. Further, this magnetic sheet was found to have a magnetic permeability μ' of 40 or higher and a magnetic loss μ" lower than 1.5 at a carrier frequency of 13.56 MHz. That is, it was confirmed that this magnetic sheet itself had good magnetic characteristics and reliability. Also, this magnetic sheet was found to have a glossiness of 19.2 at the back surface and a glossiness of 35.3 at the front surface, and the difference in glossiness between the back and front surfaces was 16.1.

COMPARATIVE EXAMPLE 1

In Comparative Example 1 (shown in Table 2), the same magnetic sheet of Example 1 was attached via an adhesive material to an antenna main body, and the resultant product was disposed as shown in FIG. 3 so as to surround the side wall of a battery pack of a portable phone. Here, in Comparative Example 1, the magnetic sheet was attached to the antenna main body and folded in a manner different from that of Example 1.

Figure 5:
FIG. 5 is an elevational view of an essential part of the configuration of an antenna in which an antenna main body is attached to a magnetic sheet of Comparative Example 1.

Specifically, in Comparative Example 1 as shown in FIG. 5, of surface A of a magnetic sheet 51 which surface contains the magnetic powder in a larger amount and surface B thereof which contains the resin binder in a larger amount; i.e., contains the magnetic powder in a smaller amount, surface B thereof containing the magnetic powder in a smaller amount was attached via an adhesive material 53 to an antenna main body 52. In addition, as shown in FIG. 6, the magnetic sheet was folded so that surface A thereof containing the magnetic powder in a larger amount was folded inward.

Figure 6:
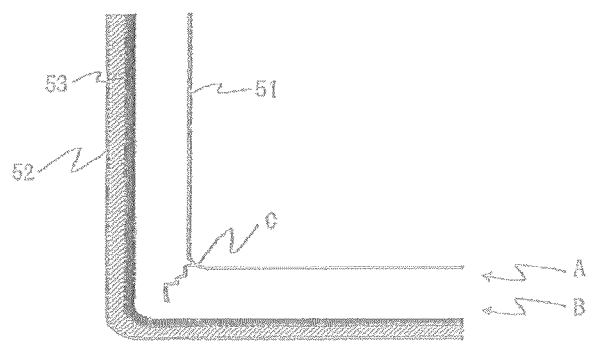
FIG. 6 is an elevational view of an essential part of a state where a magnetic sheet of Comparative Example 1 is folded.

As a result, as indicated by reference character C in FIG. 6, the magnetic sheet was found to often involve cracks in its surface. That is, when the magnetic sheet having the same composition was folded in a different direction, its resistance to folding was found to be the same as that of a conventional magnetic sheet. Notably, in Comparative Example 1, due to crack formation of the magnetic sheet, a portable phone in which the magnetic sheet had been mounted was not evaluated for characteristics.

Further, this magnetic sheet was found to have a glossiness of 23.1 at the back surface and a glossiness of 32.5 at the front surface, and the difference in glossiness between the back and front surfaces was 9.4.

COMPARATIVE EXAMPLE 2

In Comparative Example 2 as shown in Table 2, the same soft magnetic composition as in Example 1 was used to produce a magnetic sheet. The magnetic sheet of Comparative Example 2 was produced so that the gradient of the content ratio of the magnetic powder to the resin binder differed from that of the magnetic sheet of Example 1. Specifically, the magnetic sheet of Comparative Example 2 was produced as follows so that the magnetic powder content was high in both the front and back surfaces of the magnetic sheet.

First, three 180-μm thick magnetic sheets were formed as follows: the soft magnetic composition was applied onto the PET release film so that the dry mass of the magnetic sheet per square meter of the PET release film was 285 g, followed by drying. As to formation of each magnetic sheet, by adjusting the drying time to a predetermined time or longer, the magnetic powder sedimented in the soft magnetic composition toward the PET release film by the time when the soft magnetic composition was dried. Thus, the magnetic powder content of each magnetic sheet is high at the side of the PET release film but is low at the opposite side to the PET release film.

Figure 7A:
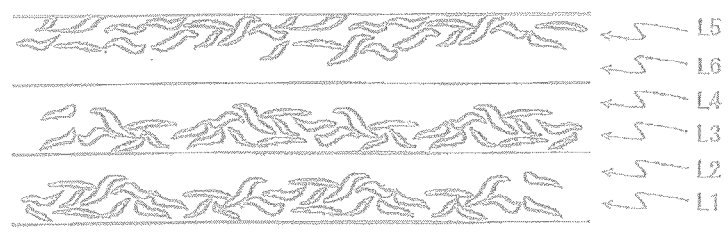
FIG. 7A is an explanatory view of a method for producing a magnetic sheet of Comparative Example 2 (part 1).

Subsequently, these three magnetic sheets were laminated. The second magnetic sheet was laminated on the first magnetic sheet in the same manner as in Example 1, to thereby form a magnetic sheet in which a layer containing the magnetic powder in a larger amount, a layer containing the resin binder in a larger amount, a layer containing the magnetic powder in a larger amount, and a layer containing the resin binder in a larger amount were laminated on the PET release film in this order. Thereafter, the third magnetic sheet was laminated on the second magnetic sheet so that their layers each containing the resin binder in a larger amount were brought into contact with each other. That is, as shown in FIG. 7A, there was produced a magnetic sheet in which layer L1 containing the magnetic powder in a larger amount, layer L2 containing the resin binder in a larger amount, layer L3 containing the magnetic powder in a larger amount, layer L4 containing the resin binder in a larger amount, layer L6 containing the resin binder in a larger amount, and layer L5 containing the magnetic powder in a larger amount were laminated on the PET release film in this order.

Figure 7B:
FIG. 7B is an explanatory view of a method for producing a magnetic sheet of Comparative Example 2 (part 2).

Next, the both surfaces of the resultant magnetic sheet were sandwiched by PET release films, and then were further sandwiched by 100-μm thick high-quality paper sheets serving as a buffering material. The both surfaces of the resultant product were sandwiched by two stainless steel plates, and then pressed at 24.9 kgf/cm$^2$ for 10 min using a predetermined vacuum press machine (product of KITAGAWA SEIKI CO., LTD.) with being heated to 170° C., to thereby a magnetic sheet used for experiments. The thus-pressed magnetic sheet was found to have a thickness of 250 μm similar to Example 1. The obtained magnetic sheet, as shown in FIG. 7B, contained the resin binder in a large amount in a center portion (area B) in the thickness direction (i.e., contained the magnetic powder in a small amount) and contained the magnetic powder in a large amount in both the front and back surfaces (areas A).

This magnetic sheet was found to have the same linear expansion coefficient (18 ppm/° C.) as that of Example 1, since it was made of the same soft magnetic composition as used in Example 1. This magnetic sheet was found to have a magnetic permeability μ' of 40 or higher and a magnetic loss μ" lower than 1.5 at a carrier frequency of 13.56 MHz. That is, this magnetic sheet was made of the same soft magnetic composition as used in Example 1 and thus, the magnetic characteristics and reliability thereof were found to be good.

Figure 8:
FIG. 8 is an elevational view of an essential part of the configuration of an antenna in which an antenna main body is attached to a magnetic sheet of Comparative Example 2.
Figure 9:
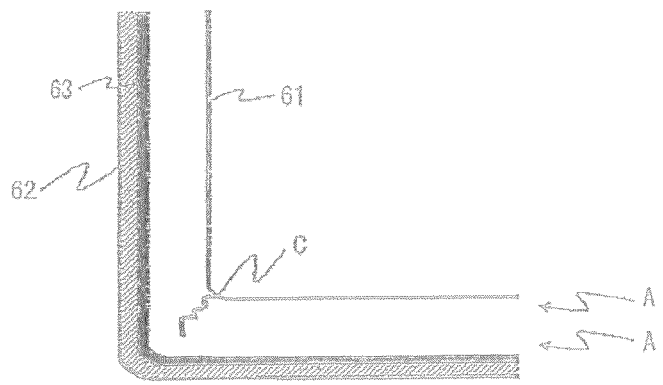
FIG. 9 is an elevational view of an essential part of a state where a magnetic sheet of Comparative Example 2 is folded.
Figure 10:
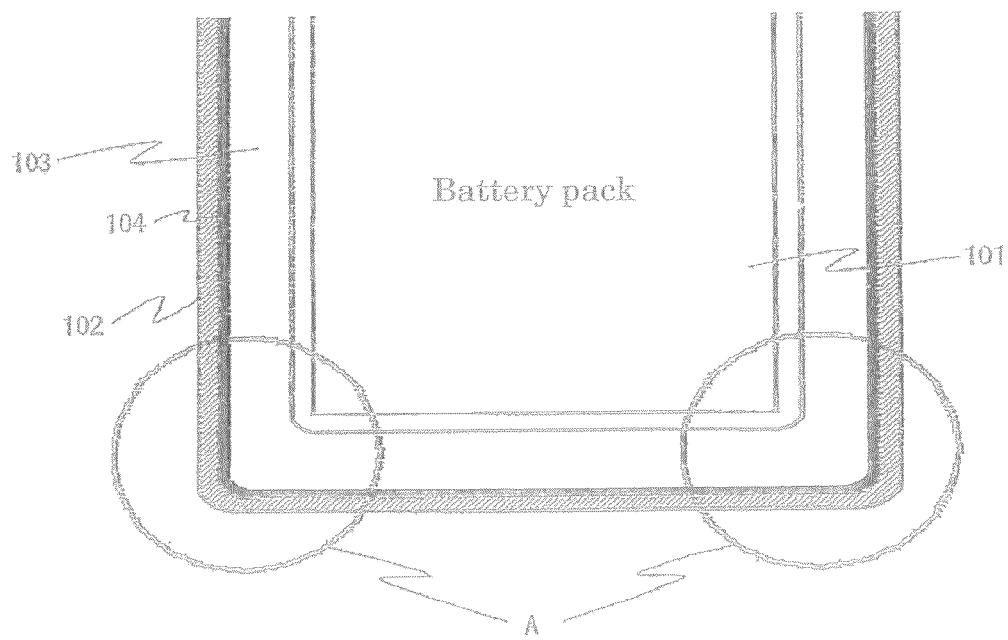
FIG. 10 is an elevational view of an essential part of a portable communication device which contains an antenna in which a conventional magnetic sheet is attached to an antenna main body.

Then, in order to evaluate this magnetic sheet for resistance to folding, as shown in FIG. 3, it was attached via an adhesive material to an antenna main body, and the resultant product was disposed so as to surround the side wall of a battery pack of a portable phone. That is, in Comparative Example 2, a magnetic sheet 61, having areas A each containing the magnetic powder in a larger amount at the both surfaces as shown in FIG. 8, was attached via an adhesive material 63 to an antenna main body 62, and then the resultant product was folded as shown in FIG. 9 so that the magnetic sheet 61 was folded inward. Furthermore, in Comparative Example 2, the resultant product was also folded so that the antenna main body 62 was folded inward (this case is not illustrated).

As a result, as indicated by reference character C in FIG. 9, the magnetic sheet was found to involve cracks in its surface in either case. The reason for this lies in that the magnetic powder is contained in a large amount in both surfaces of the magnetic sheet. Notably, in Comparative Example 2, due to crack formation of the magnetic sheet, a portable phone in which the magnetic sheet had been mounted was not evaluated for characteristics.

Further, this magnetic sheet was found to have a glossiness of 21.5 at the back surface and a glossiness of 24.8 at the front surface, and the difference in glossiness between the back and front surfaces was 3.3.

COMPARATIVE EXAMPLE 3

In Comparative Example 3, there was prepared a soft magnetic composition having the same composition as that used in Example 1, except that the epoxy group-containing acrylic rubber serving as the resin binder was changed to an acrylic rubber having, as functional groups, a carboxyl group and a hydroxyl group (SG-700AS, product of Nagase ChemteX Corporation) as shown in Table 2. The thus-prepared soft magnetic composition was used to produce a magnetic sheet similar to Example 1. The pressed magnetic sheet was found to have a thickness of 350 μm. Notably, the prepared soft magnetic composition was found to have a viscosity of 65,000 cps.

The thus-produced magnetic sheet was found to have a linear expansion coefficient of as large as 42 ppm/° C. Also, this magnetic sheet was found to have a specific gravity of as small as 2.64. And, a change in thickness thereof was found to be as large as 2.20% before and after the environmental testing using an oven. Further, this magnetic sheet was found to have a magnetic permeability $\mu'$ lower than 34 at a carrier frequency of 13.56 MHz. That is, it was confirmed that this magnetic sheet itself had poor magnetic characteristics and reliability. Notably, the magnetic sheet of Comparative Example 3 greatly changed in thickness before and after the environmental testing and thus, the presence or absence of cracks formed when it was attached to an antenna main body and folded was not determined. In addition, a portable phone in which the magnetic sheet had been mounted was not evaluated for characteristics.

Further, this magnetic sheet was found to have a glossiness of 23.9 at the back surface and a glossiness of 32 at the front surface, and the difference in glossiness between the back and front surfaces was 8.1.

COMPARATIVE EXAMPLE 4

In Comparative Example 4, there was prepared a soft magnetic composition having the same composition as that used in Example 1, except that the epoxy group-containing acrylic rubber serving as the resin binder was changed to an acrylic rubber having, as a functional group, a carboxyl group and a hydroxyl group (WA-023, product of Nagase ChemteX Corporation) as shown in Table 3. The thus-prepared soft magnetic composition was used to produce a magnetic sheet similar to Example 1. The pressed magnetic sheet was found to have a thickness of 330 μm. Notably, the prepared soft magnetic composition was found to have a viscosity of 60,000 cps.

The thus-produced magnetic sheet was found to have a linear expansion coefficient of 22 ppm/° C., which was closer to the linear expansion coefficient of an antenna main body than was the magnetic sheet of Comparative Example 3. However, this magnetic sheet was found to have a specific gravity of as small as 2.91. And, a change in thickness thereof was found to be relatively large; i.e., 1.80% before and after the environmental testing using an oven. Further, this magnetic sheet was found to have a magnetic permeability $\mu'$ lower than 34 at a carrier frequency of 13.56 MHz. That is, it was confirmed that this magnetic sheet itself had poor magnetic characteristics and reliability. Notably, the magnetic sheet of Comparative Example 4 changed in thickness before and after the environmental testing to a relatively large extent and thus, the presence or absence of cracks formed when it was attached to an antenna main body and folded was not determined. In addition, a portable phone in which the magnetic sheet had been mounted was not evaluated for characteristics.

Further, this magnetic sheet was found to have a glossiness of 23.4 at the back surface and a glossiness of 33.4 at the front surface, and the difference in glossiness between the back and front surfaces was 10.

COMPARATIVE EXAMPLE 5

In Comparative Example 5, there was prepared a soft magnetic composition having the same composition as that used in Example 1, except that the epoxy group-containing acrylic rubber serving as the resin binder was changed to a nitrile rubber (NBR) having a carboxyl group as a functional group (Nipol (registered trademark) 1027J, product of ZEON CORPORATION) as shown in Table 3. The thus-prepared soft magnetic composition was used to produce a magnetic sheet similar to Example 1. The pressed magnetic sheet was found to have a thickness of 300 μm. Notably, the prepared soft magnetic composition was found to have a viscosity of 50,000 cps.

The thus-produced magnetic sheet was found to have a linear expansion coefficient of 17 ppm/° C., which was close to the linear expansion coefficient of an antenna main body. However, a change in thickness thereof was found to be as large as 3.00% before and after the environmental testing using an oven. Further, this magnetic sheet was found to have a magnetic permeability lower than 34 at a carrier frequency of 13.56 MHz. That is, it was confirmed that this magnetic sheet itself had poor magnetic characteristics and reliability. Notably, the magnetic sheet of Comparative Example 5 greatly changed in thickness before and after the environmental testing and thus, the presence or absence of cracks formed when it was attached to an antenna main body and folded was not determined. In addition, a portable phone in which the magnetic sheet had been mounted was not evaluated for characteristics.

Further, this magnetic sheet was found to have a glossiness of 24.3 at the back surface and a glossiness of 34.5 at the front surface, and the difference in glossiness between the back and front surfaces was 10.2.

COMPARATIVE EXAMPLE 6

In Comparative Example 6 (see Table 3), as a flat magnetic powder, there was provided a product obtained by subjecting 500 parts by mass of a Fe—Si—Cr—Ni based alloy powder (product of Mitsubishi Materials Corporation) to coupling treatment using 10 parts by mass of a silane coupling agent (Z6040, Dow Corning Toray Co., Ltd.). As a resin binder, there was provided 100 parts by mass of a polyester resin (BYRON (registered trademark) 500, product of TOYOBO CO., LTD.). As a crosslinking agent, there was provided 10 parts by mass of a blocked isocyanate (CORONATE (registered trademark) 2507, product of NIPPON POLYURETHANE INDUSTRY CO., LTD.). As a solvent, there was provided a solvent mixture containing 50 parts by mass of isopropyl alcohol (IPA), 210 parts by mass of toluene, and 30 parts by mass of methyl ethyl ketone (MEK). The resin binder, solvent and flat magnetic powder were homogeneously mixed with one another to prepare a soft magnetic composition. Notably, the thus-prepared soft magnetic composition was found to have a viscosity of 68,000 cps. Then, the soft magnetic composition was applied using a roll coater onto a PET release film (a base whose surface was subjected to release treatment), followed by drying at a temperature of room temperature to 115° C., to thereby produce a magnetic sheet. The magnetic sheet finally used for the experiments was produced by performing the above applying and drying steps four times using the same soft magnetic composition, and finally pressing the resultant product. Notably, the reason why the magnetic sheet has a four-layered structure is that, when a polyester resin is used as the resin binder, the solvent volatilizing upon drying cannot be released outside from the front and back surfaces of the magnetic sheet and swells inside the magnetic sheet.

Specifically, the first magnetic sheet was formed as follows: the soft magnetic composition was applied onto the PET release film so that the dry mass of the magnetic sheet per square meter of the PET release film was 255 g, followed by drying. The resultant magnetic sheet was found to have a thickness of 140 μm. Notably, in this case, since the thickness of the formed layer (sheet) was small, the magnetic powder did not sediment in the soft magnetic composition toward the PET release film by the time when the soft magnetic composition was dried.

Subsequently, the second magnetic sheet was formed as follows: the soft magnetic composition having the same composition was applied onto the first magnetic sheet so that the total mass of the first magnetic sheet and the second magnetic sheet after drying was 455 g, followed by drying. The resultant magnetic sheet was found to have a thickness of 220 μm. Also in this case, since the thickness of the formed layer (sheet) was small, the magnetic powder did not sediment in the soft magnetic composition toward the PET release film by the time when the soft magnetic composition was dried.

Furthermore, the third magnetic sheet was formed as follows: the soft magnetic composition having the same composition was applied onto the second magnetic sheet so that the total mass of the first and second magnetic sheets and the third magnetic sheet after drying was 675 g, followed by drying. The resultant magnetic sheet was found to have a thickness of 300 μm. Also in this case, since the thickness of the formed layer (sheet) was small, the magnetic powder did not sediment in the soft magnetic composition toward the PET release film by the time when the soft magnetic composition was dried.

Furthermore, the fourth magnetic sheet was formed as follows: the soft magnetic composition having the same composition was applied onto the third magnetic sheet so that the total mass of the first to third magnetic sheets and the fourth magnetic sheet after drying was 915 g, followed by drying. The resultant magnetic sheet was found to have a thickness of 400 μm. Also in this case, since the thickness of the formed layer (sheet) was small, the magnetic powder did not sediment in the soft magnetic composition toward the PET release film by the time when the soft magnetic composition was dried.

Next, the PET release film was removed from the magnetic sheet obtained after drying. The both surfaces of the resultant magnetic sheet were sandwiched by new PET release films, and then further sandwiched by 100-μm thick high-quality paper sheets serving as a buffering material. The both surfaces of the resultant product were sandwiched by two stainless steel plates, and then pressed at 6.7 kgf/cm² for 10 min using a predetermined vacuum press machine (product of KITAGAWA SEIKI CO., LTD.) with being heated to 170° C., to thereby a magnetic sheet used for experiments. The thus-pressed magnetic sheet was found to have a thickness of 250 μm, which was the same as that of the magnetic sheet of Example 1.

The thus-produced magnetic sheet was found to have a linear expansion coefficient of as large as 52 ppm/° C. Also, a change in thickness thereof was found to be as large as 3.00% before and after the environmental testing using an oven. Further, this magnetic sheet was found to have a magnetic permeability μ' of 40 or higher and a magnetic loss μ" lower than 1.5 at a carrier frequency of 13.56 MHz. That is, it was confirmed that this magnetic sheet itself had good magnetic characteristics and reliability. In other words, although greatly deformed before and after the environmental testing, this magnetic sheet itself had good magnetic characteristics and reliability.

Further, this magnetic sheet was found to have a glossiness of 36.2 at the back surface and a glossiness of 35.8 at the front surface, and the difference in glossiness between the back and front surfaces was 0.4.

In order to evaluate this magnetic sheet for resistance to folding, as shown in FIG. 3, it was attached via an adhesive material to an antenna main body. The resultant product was disposed so as to surround the side wall of a battery pack of a portable phone. As a result, the magnetic sheet was found to involve no cracks in its surface even when folded in either direction.

Further, in order to evaluate the characteristics of a portable phone in which the magnetic sheet had been mounted, the portable phone was placed for 96 hours in an oven whose temperature and humidity had been set respectively to 85° C. and 60% for environmental testing. Specifically, before placed in the oven, the portable phone was measured for the resonant frequency. And, after heated in the oven, the portable phone taken from the oven was returned to ambient temperature and then was measured the resonant frequency. The thus-obtained resonant frequencies were compared with each other.

As a result, as shown in Table 4, the portable phone was changed in resonant frequency before and after the environmental testing using the oven. The resonant frequency of the portable phone after placed in the oven was not returned to that of the portable phone before placed in the oven. This indicates that the communication distance changes depending on a change of its surrounding environment, and the characteristics of the magnetic sheet were poor.

These results indicate that the magnetic sheet of the present invention is remarkably advantageous. The magnetic sheet of the present invention is advantageously used when wound inside as well as when folded. Although a Fe—Si—Cr—Ni-based alloy powder and an acrylic rubber were used respectively as the magnetic powder and the binder in Examples 1 to 4, it is easily conceived that similar results can be obtained using magnetic powder/resin combinations different from the above. It goes without saying that the present invention can be appropriately modified without departing from the spirit of thereof.

What is claimed is:

1. A magnetic sheet comprising:
   a flat magnetic powder, and
   a resin binder capable of dissolving in a solvent,
   wherein the magnetic sheet has a gradient of the content ratio of the magnetic powder to the resin binder (the density of the resin binder being gradually increased or decreased) in a thickness direction thereof,
   wherein, in use, the magnetic sheet is folded so that, of the front and back surfaces thereof, one surface whose magnetic powder content is lower than that of the other is folded inward, and
   wherein the difference in glossiness measured at a light-incident angle of 60° between the front and back surfaces is 9.4 or more.

2. The magnetic sheet according to claim 1, wherein the resin binder is a copolymer of an epoxy resin and an acrylic rubber having an epoxy group as a functional group.

3. The magnetic sheet according to claim 1, wherein the magnetic sheet is produced by applying onto a predetermined base a magnetic composition which comprises the flat magnetic powder and the resin binder capable of dissolving in a solvent and has such a mixing ratio thereof or viscosity that the magnetic powder sediments, and drying over a predetermined time or longer the magnetic composition applied.

4. The magnetic sheet according to claim 3, wherein the magnetic sheet is a magnetic sheet which is produced by performing, once or more, applying a magnetic composition having the same composition as that of the magnetic composition onto the magnetic sheet having been formed by drying the magnetic composition, and drying over a predetermined time or longer the magnetic composition applied.

5. The magnetic sheet according to claim 3, wherein the magnetic sheet is a magnetic sheet which is produced by pressing the magnetic sheet having been formed by drying the magnetic composition.

6. The magnetic sheet according to claim 1,
wherein the difference in glossiness measured at a light-incident angle of 60° between the front and back surfaces is 16.1 or less.

7. The magnetic sheet according to claim 3, wherein the drying comprises drying and thermally curing over a predetermined time or longer the magnetic composition applied.

8. A method for producing a magnetic sheet, the method comprising:
applying onto a predetermined base a magnetic composition which comprises a flat magnetic powder and a resin binder capable of dissolving in a solvent and has such a mixing ratio thereof or viscosity that the magnetic powder sediments, and
drying the magnetic composition applied onto the base over a predetermined time or longer so as to produce a magnetic sheet which has a gradient of the content ratio of the magnetic powder to the resin binder (the density of the resin binder being gradually increased or decreased) in a thickness direction thereof and in which the difference in glossiness measured at a light-incident angle of 60° between front and back surfaces is 9.4 or more.

9. The method according to claim 8, further comprising secondarily applying, onto the magnetic sheet having been formed by drying the magnetic composition, a magnetic composition having the same composition as that of the magnetic composition; and secondarily drying over a predetermined time or longer the magnetic composition applied onto the magnetic sheet in the secondarily applying,
wherein the secondarily applying and the secondarily drying are performed once or more to produce a magnetic sheet having a gradient of the content ratio of the magnetic powder to the resin binder in a thickness direction thereof.

10. The method according to claim 8, further comprising pressing the magnetic sheet formed by drying the magnetic composition.

11. The method according to claim 8, comprising heating and drying the magnetic composition applied onto the base.

12. An antenna comprising:
a magnetic sheet which comprises a flat magnetic powder and a resin binder capable of dissolving in a solvent and which has a gradient of the content ratio of the magnetic powder to the resin binder (the density of the resin binder being gradually increased or decreased) in a thickness direction thereof, and
an antenna main body which is attached, of the front and back surfaces of the magnetic sheet, to one surface whose magnetic powder content is higher than that of the other,
wherein the antenna is folded so that, of the front and back surfaces of the magnetic sheet, one surface whose magnetic powder content is lower than that of the other is folded inward, and
wherein the difference in glossiness measured at a light-incident angle of 60° between the front and back surfaces is 9.4 or more.

13. The antenna according to claim 12, wherein the antenna main body comprises copper, and the resin binder is a copolymer of an epoxy resin and an acrylic rubber having an epoxy group as a functional group.

14. The antenna according to claim 12, wherein the antenna main body has a structure utilizing a flexible flat cable.

15. The antenna according to claim 12, wherein the magnetic sheet is an uncracked magnetic sheet.

16. A portable communication device comprising:
a transponder which stores various data so as to be readable or writable and which has a communication function,
wherein the transponder comprises an antenna in which an antenna main body is attached, of the front and back surfaces of a magnetic sheet which comprises a flat magnetic powder and a resin binder capable of dissolving in a solvent and which has a gradient of the content ratio of the magnetic powder to the resin binder (the density of the resin binder being gradually increased or decreased) in a thickness direction thereof, to one surface whose magnetic powder content is higher than that of the other,
wherein the antenna is folded so that, of the front and back surfaces of the magnetic sheet, one surface whose magnetic powder content is lower than that of the other is folded inward, and
wherein the difference in glossiness measured at a light-incident angle of 60° between the front and back surfaces is 9.4 or more.

* * * * *